United States Patent
Iwazaki

(10) Patent No.: US 6,374,167 B2
(45) Date of Patent: Apr. 16, 2002

(54) AUTOMATIC STEERING DEVICE FOR VEHICLES CANCELING STEERING DEVIATION QUICKER WHEN LARGER

(75) Inventor: Katsuhiko Iwazaki, Shizuoka-ken (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/885,026

(22) Filed: Jun. 21, 2001

(30) Foreign Application Priority Data

Aug. 1, 2000 (JP) ........................................ 2000-232717

(51) Int. Cl.$^7$ ................................................ B62D 1/00
(52) U.S. Cl. ............................................ 701/41; 701/43
(58) Field of Search ............................. 701/41, 42, 43; 180/410, 443

(56) References Cited

U.S. PATENT DOCUMENTS

| | | | | |
|---|---|---|---|---|
| 5,845,738 A | * | 12/1998 | Nishino et al. | 180/443 |
| 6,032,091 A | * | 2/2000 | Noro et al. | 701/42 |
| 6,059,068 A | * | 5/2000 | Kato et al. | 701/43 |
| 6,070,692 A | * | 6/2000 | Nishino et al. | 701/41 |
| 6,278,922 B1 | * | 8/2001 | Nishiwaki | 701/41 |

FOREIGN PATENT DOCUMENTS

| | | |
|---|---|---|
| JP | A 1-161408 | 6/1989 |
| JP | A 4-55168 | 2/1992 |
| JP | A 11-78936 | 3/1999 |
| JP | A 11-157464 | 6/1999 |
| JP | A 2941130 | 8/1999 |
| JP | A 2000-118334 | 4/2000 |

* cited by examiner

*Primary Examiner*—Richard M. Camby
(74) *Attorney, Agent, or Firm*—Oliff & Berridge, PLC

(57) ABSTRACT

In an automatic steering device adapted to generate a target steering movement of steering vehicle wheels and to actuate a steering mechanism so that the steering vehicle wheels are steered to follow the target steering movement in a feedback manner that a deviation of an actual steering movement from the target steering movement of the steering vehicle wheels is canceled, the speed of canceling the deviation is increased along with increase of the deviation at least up to a certain threshold value.

11 Claims, 8 Drawing Sheets

AUTOMATIC STEERING DEVICE FOR VEHICLES CANCELING STEERING DEVIATION QUICKER WHEN LARGER

BACKGROUND OF THE INVENTION

1. Field of the Invention

The present invention relates to an automatic steering device for a vehicle such as an automobile, and more particularly, to an improvement in the control efficiency of such an automatic steering device.

2. Description of the Prior Art

Various devices have been proposed to automatically steer vehicles such as automobiles. Primarily, the art of automatic steering of vehicles was to automatically drive an automobile along a highway or a street with an assistance of various guide means. In the art of such an automatic automobile driving, the control is generally conducted such that a deviation of an actual driving course from a target driving course is detected and the steering system is adjusted to cancel the deviation according to a feedback control incorporating various combinations of proportioning, integrating and differentiating processes of control parameters. For example, in Japanese Patent Laid-open Publication 1-161408 (1989), an automatic steering device for an unmanned vehicle is so constructed that a deviation from a driving course of the vehicle is detected as a combination of a lateral shifting, a differentiation of the lateral shifting by a drive distance, an integration of the lateral shifting by the drive distance and an angle of posture of the vehicle, so that the detected values are multiplied by respective gains to be fed back for an automatic steering of the vehicle, wherein an integration of the lateral shifting by time and an angular velocity of the vehicle are further fed back with a multiplication of respective gains, for a steering motor being actuated at a speed calculated based upon a difference between a target value and the fed-back value under a condition that the steering angle does not exceed a predetermined allowable limit.

On the other hand, it has also been tried to park or garage an automobile by an automatic steering, as proposed, for example, in Japanese Patent Laid-open Publication 4-55168 (1992) or Japanese Patent Laid-open Publication 2000-118334. In Publication 4-55168, there is described an automatic steering device for garaging an automobile according to a predetermined pattern by getting positional information of the vehicle body with reference to a side wall of a garage or by a reflection of a light beam on a mirror plate embedded on a floor at the entrance of the garage, wherein the garaging of the automobile according to the predetermined pattern is fundamentally conducted by steering a pair of steering vehicle wheels according to a predetermined schedule relative to a longitudinal movement of the automobile. In Publication 2000-118334, there is described a parking assisting device adapted to estimate by a micro-computer a steering behavior for parking an automobile and vocally advise the driver of successive operations of a steering wheel.

SUMMARY OF THE INVENTION

By incorporating the so-called PID control in the automatic steering, as in the above-mentioned Publication 1-161408, the vehicles will generally be driven to follow a target course by being home biased to the target course when the actual course deviates from the target course, with a home biasing steering force being applied thereto in proportion to the deviation of the actual course from the target course, while such a home biasing steering force is increased more rapidly when the deviation occurs more swiftly, with a long termed adjustment of the control so that no large biasing is caused by an accumulation of a small deviation.

However, in the steering of the vehicle wheels, a larger deviation of an actual course of the rotating vehicle wheels from a target course thereof generates a larger force for more deviating the rotating vehicle wheels from the target course. Therefore, when an automatic steering of the vehicle wheels is controlled by a conventional PID control such that a home biasing force or torque applied to the steering vehicle wheels is increased proportionally to the biasing of an actual course from a target course, even with a forecasting modification by a differentiation of the deviation or a feedback of an accumulation of deviation by an integration, the increased home biasing force or torque is fundamentally balanced by the increased deviation force due to the increased deviation, so that a time required for canceling the deviation is proportionally increased according to the increase of the deviation.

Indeed, however, it is contemplated that the deviation of an actual course of the rotating steering vehicle wheels from a target course thereof should desirably be canceled at a higher speed as it is larger, because a larger deviation of the actual course from the target course is more harmful against the correct course control, while such a larger deviation is less sensitive to a high speed correction control.

Therefore, it is a primary object of the present invention to provide an automatic steering device for a vehicle such as an automobile, by which a pair of steering vehicle wheels are automatically steered so that a deviation of an actual course of rotation of the steering vehicle wheels from a target course thereof is canceled at a higher speed when the deviation is larger at least up to an appropriate threhold value.

According to the present invention, the above-mentioned primary object is accomplished by an automatic steering device for a vehicle having a pair of steering vehicle wheels, a steering wheel, and a power-assisted steering mechanism for converting a steering movement of the steering wheel to a corresponding steering movement of the steering vehicle wheels, comprising:

a first means for generating a target steering movement of the steering vehicle wheels; and a second means for intervening in the steering mechanism for actuating the steering mechanism so that the steering vehicle wheels are steered to follow the target steering movement in such a feedback manner that a deviation of an actual steering movement from the target steering movement of the steering vehicle wheels is canceled at a speed of cancellation which is increased along with an increase of the deviation at least up to a threshold value determined therefor.

When the automatic steering device is so constructed that, if an actual course of rotation of the steering vehicle wheels deviates more from a target course (within the threshold value), the steering vehicle wheels are steered to cancel the deviation at a higher speed of cancellation, the vehicle is steered to follow the target course at a higher overall precision throughout the time of operation, rendering a higher responsiveness of the control, without sacrificing the stability of control, because the speed of home biasing is increased only when the deviation from the home position is large, while the speed of home biasing is decreased along with approaching to the home position.

In the automatic steering device of the above-mentioned construction, the second means may cancel the deviation by a cyclic repetition of a detection of the deviation and an actuation of the steering mechanism toward the cancellation of the deviation at each speed of cancellation due for each deviation. By such an arrangement, the automatic steering control according to the present invention can be carried out by a step-wise computer control according to a circulation through a series of control calculation or judgment steps.

In the automatic steering device of the above-mentioned construction, the second means may modify the speed of canceling the deviation according to a friction coefficient of a road surface so as to be relatively higher or lower according to whether the friction coefficient is relatively higher or lower, respectively. By such an arrangement, the automatic steering control is more precisely adjusted to the road surface conditions.

In the automatic steering device of the above-mentioned construction, the second means may modify the speed of canceling the deviation according to a vehicle speed so as to be relatively lower or higher according to whether the vehicle speed is relatively higher or lower, respectively. By such an arrangement, the automatic steering control is more appropriately adjusted to the particular steering performance of a rotating wheel dependent on the rotation speed.

In the automatic steering device of the above-mentioned construction, the second means may stop canceling the deviation when a vehicle speed has lowered below a threshold value determined therefor. By such an arrangement, the automatic steering control of the vehicle for parking or garaging the vehicle is carried out at a higher efficiency without causing a useless consumption of a battery or other electric accumulator.

In the automatic steering device of the above-mentioned construction, the second means may stop canceling the deviation when the deviation has lowered below a threshold value determined therefor, while actuating the steering mechanism so that the steering vehicle wheels are held against being moved in a steering direction due to an elastic deformation of tires of the steering vehicle wheels. By such an arrangement, the automatic steering control for parking or garaging the vehicle is carried out at a high stability without causing an undue oscillation in the final stage of control.

In the automatic steering device of the above-mentioned construction, the deviation cancellation speed may be so targeted as to increase along with an increase of the difference up to the threshold value determined therefor and to saturate at a final value for a further increase of the deviation. By such an arrangement, the cancellation speed can be more flexibly controlled at a reasonable cost of the automatic steering device.

In the automatic steering device of the above-mentioned construction, the target deviation cancellation speed may be so modified according to a friction coefficient of a road surface as to be relatively higher or lower against the deviation according to whether the friction coefficient is relatively higher or lower, respectively. By such an arrangement, the cancellation speed can be more flexibly controlled to be more precisely adjusted to the road surface conditions at a reasonable cost of the automatic steering device.

In the automatic steering device of the above-mentioned construction, the target cancellation speed may be so modified according to a vehicle speed as to be relatively lower or higher against the deviation according to whether the vehicle speed is relatively higher or lower, respectively. By such an arrangement, the cancellation speed can be more flexibly controlled to be more appropriately adjusted to the particular steering performance of a rotating wheel dependent on the rotation speed at a reasonable cost of the automatic steering device.

In the automatic steering device of the above-mentioned construction, the second means may stop canceling the deviation when the target deviation canceling speed is not followed by an actual speed of movement of the steering vehicle wheels beyond a threshold difference determined therefor. By such an arrangement, it is avoided that the automatic steering device is unduly operated when a steering vehicle wheel was blocked against a steering by a trimming flange or the like.

The automatic steering device of the above-mentioned construction may further comprise a third means for detecting if the steering wheel is turned by a driver, so as to dispatch an alarm to the driver when the deviation canceling speed is not followed beyond the threshold difference determined therefor with no driver's turning of the steering wheel. By such an arrangement, the driver is informed that a steering vehicle wheel was blocked against a steering by a trimming flange or the like, discriminating that the steering device is unduly operated by himself/herself.

BRIEF DESCRIPTION OF THE DRAWINGS

In the accompanying drawings.

DESCRIPTION OF THE EMBODIMENTS

In the following, the present invention will be described in more detail in the form of some preferred embodiments with reference to the accompanying drawings.

Figure 1:
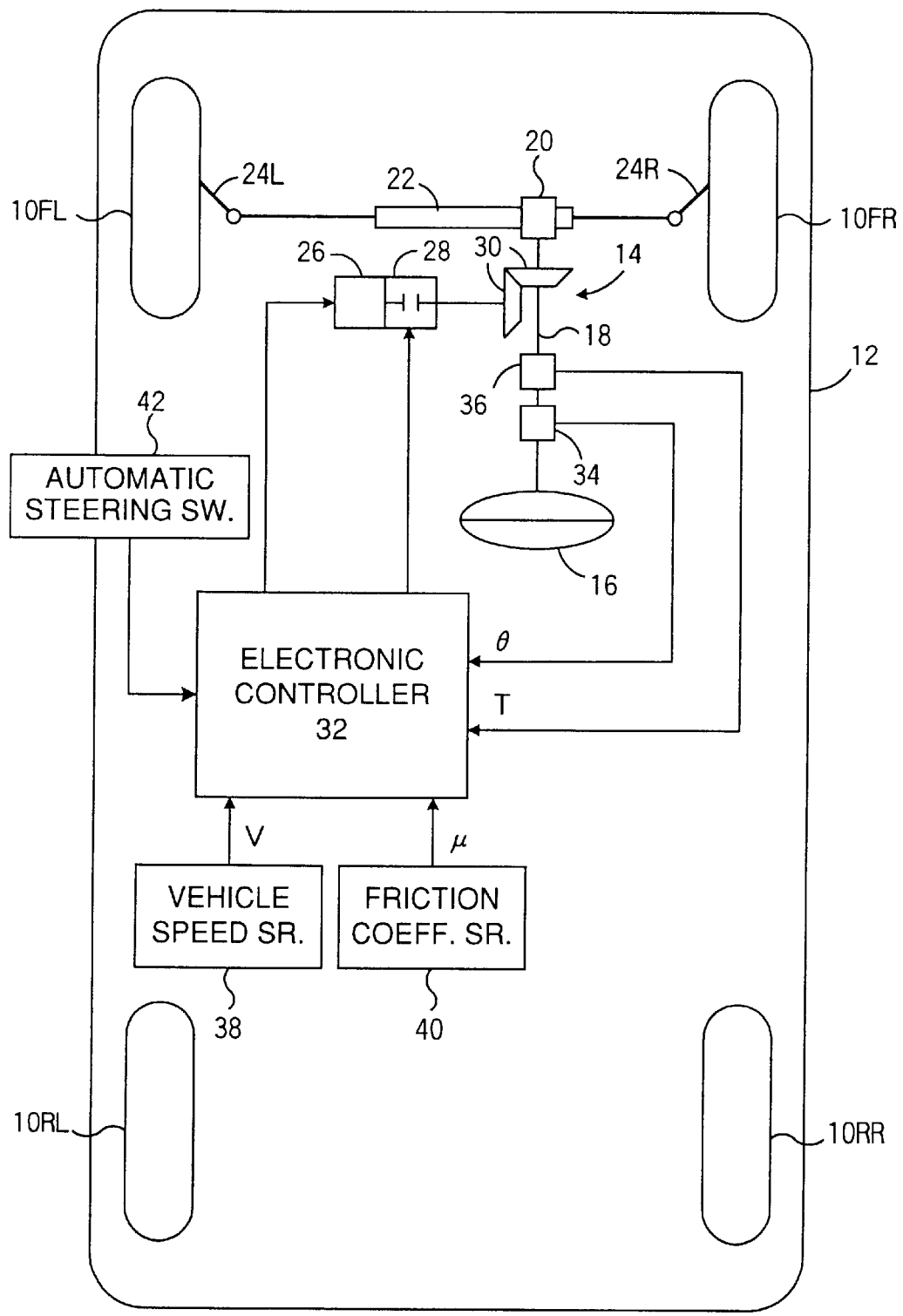
FIG. 1 is a diagrammatical illustration of a four-wheeled vehicle in which the automatic steering device according to the present invention is incorporated in the form of an embodiment.

Referring to FIG. 1, a four-wheeled vehicle such as an automobile therein shown has a pair of front left and right vehicle wheels 10FL and 10FR, a pair of rear left and right vehicle wheels 10RL and 10RR, and a vehicle body 12 supported by these vehicle wheels. The vehicle is steered by the pair of front left and right vehicle wheels 10FL and 10FR with a power-assisted steering system generally designated by 14, including a steering wheel 16, a steering shaft 18, a pinion 20, a rack 22, and a pair of connecting rods 24L and 24R. The steering rotation of the steering shaft 18 is assisted by a power of a motor 26 through a clutch 28 and a couple of bevel gears 30. The motor 26 is controlled by an electronic controller 32 which is supplied with information with regard to a steering operation by a driver from a steering angle sensor 34 and a steering torque sensor 36 mounted around the steering shaft 18, in addition to such information as a vehicle speed from a vehicle speed sensor 38, a friction coefficient of a road surface from a friction coefficient sensor 40, and a driver's intention for an automatic steering from an automatic steering switch 42.

The steering system shown in FIG. 1 generally operates as a power-assisted steering system in which the steering operation applied to the steering wheel 16 by a driver is detected as a rotation angle of the steering shaft 18 and a torque in the steering shaft 18 by the steering angle sensor 34 and the steering torque sensor 36, respectively, and the electronic controller 32 operates the motor 26 so as to appropriately assist the driver's rotation of the steering shaft 18.

The automatic steering device according to the present invention is substantially incorporated in the electronic controller 32, so as to intervene in the power-assisted steering system 14 by selectively operating the motor 32 according to a self control judgment made by the electronic controller for an automatic steering of the vehicle. A basic embodiment of such a self control of the automatic steering will be described with reference to the flowchart of FIG. 2.

The control operation through this flowchart is started when an ignition switch (not shown) of the vehicle is closed for starting the driving of the vehicle, and cyclically repeated therethrough at a cycle period such as several tens of microseconds. When the control is started, in step 10, data required for the control such as those shown in FIG. 1 are read in.

Figure 3:
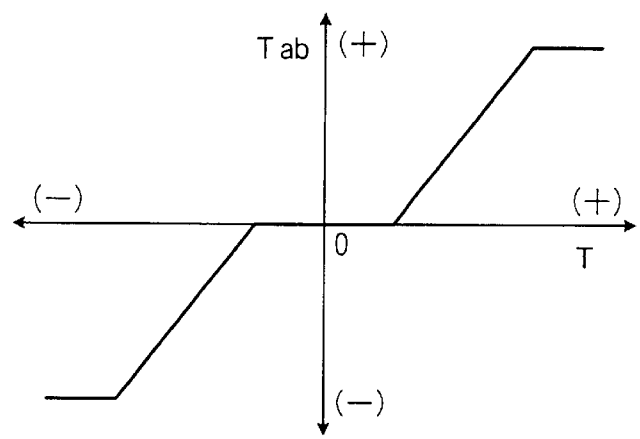
FIG. 3 is a diagram showing a first embodiment of calculating a target steering angular velocity against a deviation of an actual steering angle from a target steering angle.
Figure 4:
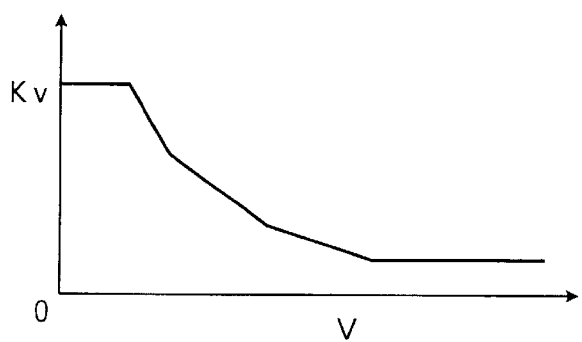
FIG. 4 is a diagram showing an embodiment of calculating a steering assisting torque against a driver's steering torque.

Then, in step 20, it is judge if the automatic steering switch 42 is made "on" by the driver, so that the automatic steering device is to operate. When the answer is "no", the control proceeds to step 30, and a basic power-assisted steering operation is carried out. In this case, a standard steering assisting torque Tab is calculated according to a steering torque T detected by the steering torque sensor 34 by looking up a diagram such as shown in FIG. 3. Then in step 40, a vehicle speed factor Kv is calculated according to a vehicle speed V detected by the vehicle speed sensor 38 by looking up a diagram such as shown in FIG. 4. Then in step 50, a steering assisting torque Ta to be put in to the steering shaft 18 by the motor 32 is calculated as Ta=Kv·Tab. Then in step 60, the power assisting operation is carried out by operating the motor 26, so as to put in the assisting torque Tab.

When the answer of step 20 is "yes", the control proceeds to step 70, and a target steering angle $\theta t$ is calculated according to any optional automatic steering control method, such as, for example, the automatic garaging method described in the above-mentioned Publication 4-55168. It is not the object of the present invention to specify the target steering angle or a schedule thereof.

Figure 5:
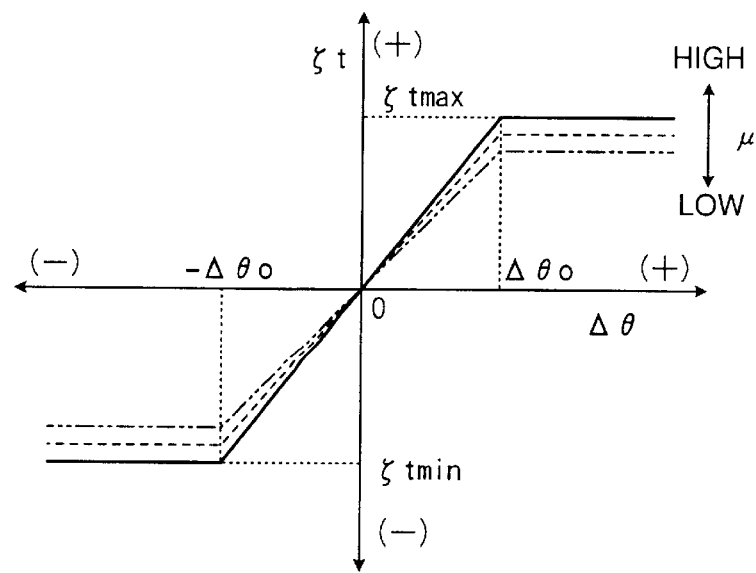
FIG. 5 is a diagram showing an embodiment of calculating a vehicle speed factor against a vehicle speed.
Figure 6:
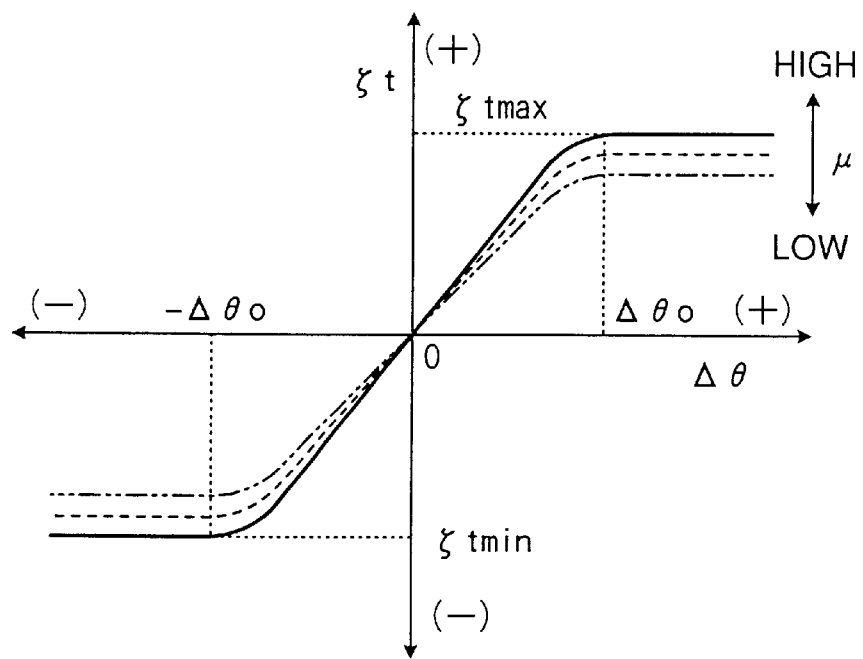
FIG. 6 is a diagram showing a second embodiment of calculating the target steering angular velocity against the deviation.
Figure 7:
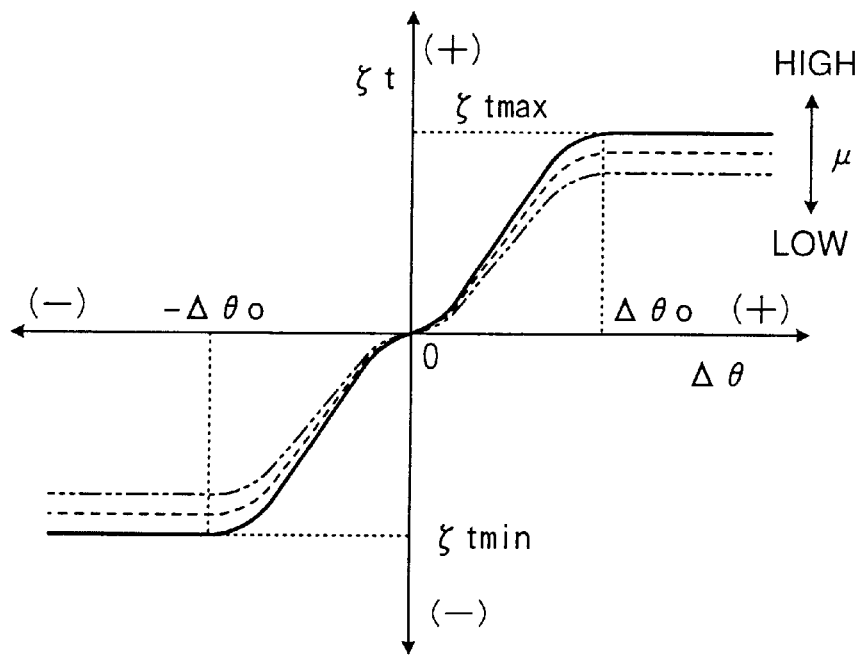
FIG. 7 is a diagram showing a third embodiment of calculating the target steering angular velocity against the deviation.
Figure 8:
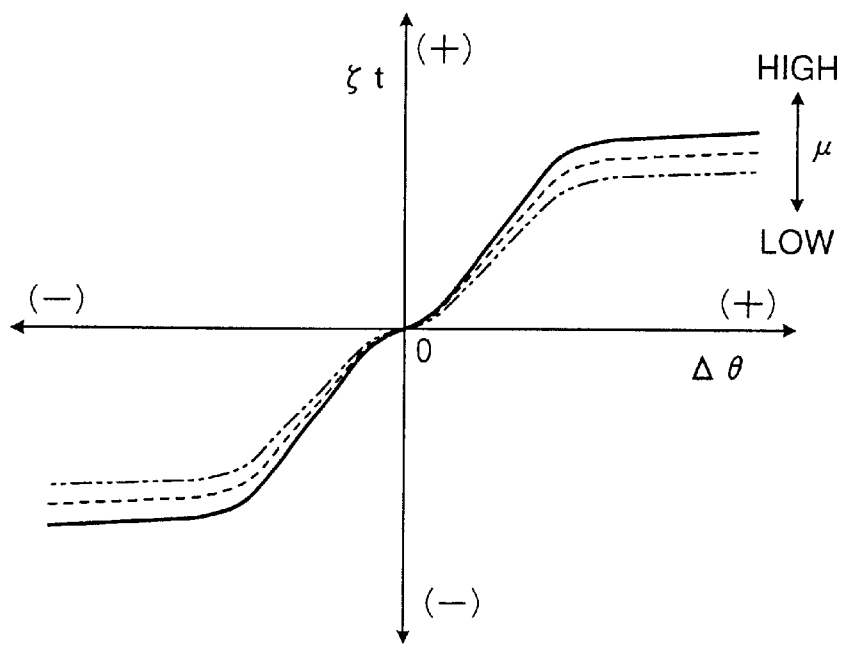
FIG. 8 is a diagram showing a fourth embodiment of calculating the target steering angular velocity against the deviation.

In step 80, a deviation $\Delta\theta$ of the actual steering angle $\theta$ detected by the steering angle sensor 34 from the target steering angle $\theta t$ is calculated as $\Delta\theta=\theta t-\theta$. Then in step 90, a target steering angular velocity $\zeta t$ is calculated by looking up a diagram such as shown in FIG. 5. The target steering angular velocity $\zeta t$ is the velocity of driving the steering shaft 18 by the motor 26 so that the actual steering angle $\theta$ coincides with the target steering angle $\theta t$. As will be noted in the diagram of FIG. 5, the target steering angular velocity $\zeta t$ is increased along with an increase of the deviation $\Delta\theta$ of the actual steering angle $\theta$ from the target steering angle $\theta t$ up to a threshold value $\zeta tmax$ against a deviation such as $\Delta\theta o$, and thereafter the target steering angular velocity $\zeta t$ is saturated to be at the final value of the increase. Since the steering angle $\theta$ as well as the steering angular velocity $\zeta$ are parameters having opposite directions, they are expressed as positive and negative values according to the directions of steering. Only as a matter of such a mathematical rule of expression, in the steering in the opposite direction the target steering angular velocity $\zeta t$ is decreased along with a decrease of the deviation $\Delta\theta$ in the opposite direction down to a certain threshold minimum value $\zeta tmin$, and thereafter the target steering angular velocity $\zeta t$ is saturated to be at the final value of the decrease. However, such an opposite steering operation will be herein omitted for the purpose of clarity of the description. Further, the rate of increase of the target steering angular velocity $\zeta t$ against the steering angle deviation $\Delta\theta$ and its final maximum value $\zeta tmax$ are made relatively larger or smaller according to a relative highness or lowness of the friction coefficient $\mu$ of a road surface detected by the friction coefficient sensor 40.

In step 100, the target angular velocity $\zeta t$ calculated in step 90 is modified according to the vehicle speed so that the target angular velocity $\zeta t$ is decreased or increased according to a relative highness or lowness of the vehicle speed detected by the vehicle speed sensor 38, so that a change of the steering performance of rotating vehicle wheels due to the speed of rotation is compensated for.

In step 110, a deviation of an actual steering angular velocity $\zeta$ calculated by differentiating the actual steering angle $\theta$ from the target angular velocity $\zeta t$ is calculated as $\Delta\zeta=\zeta t-\zeta$.

In step 120, the motor 26 is operated to drive the steering system so that the steering system is steered according to the target steering angle $\theta t$ at the target steering angular velocity $\zeta t$ by the motor 26 being operated at a controlled rotation angle and a controlled torque cyclically so adjusted as to cancel the steering angle deviation $\Delta\theta$ calculated in step 80 and the steering angular velocity deviation $\Delta\zeta$ calculated in step 110.

Figure 2:
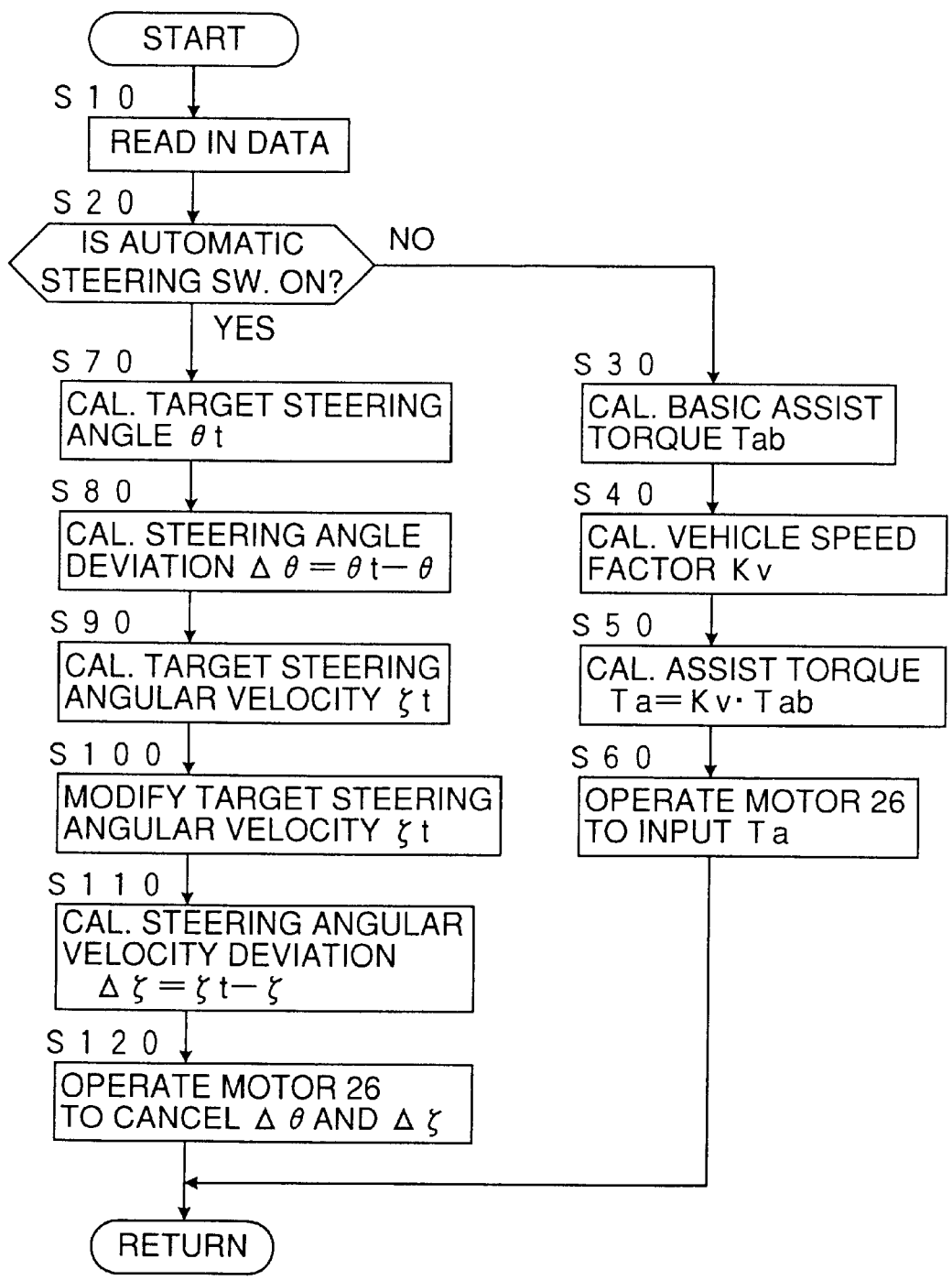
FIG. 2 is a flowchart showing a basic operation of the steering system of the vehicle shown in FIG. 1.
Figure 9:
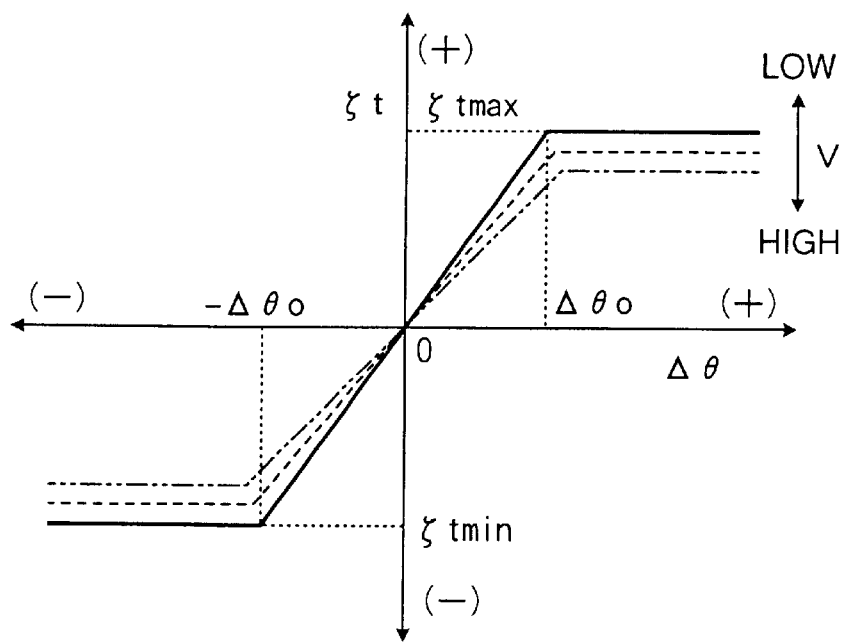
FIG. 9 is a diagram showing a fifth embodiment of calculating the target steering angular velocity against the deviation.

FIGS. 6–9 show diagrams similar to that shown in FIG. 5, in which the scheduling of the target steering angular velocity $\zeta t$ against the steering angle deviation $\Delta\theta$ is variously modified so as to finely adjust the automatic steering performance available by the control operation according to the flowchart shown in FIG. 2. In this connection, it will be noted that when the diagram of FIG. 9 is used in step 90, the modification of the target steering angular velocity in step 100 will be a modification according to the friction coefficient of a road surface.

Figure 10:
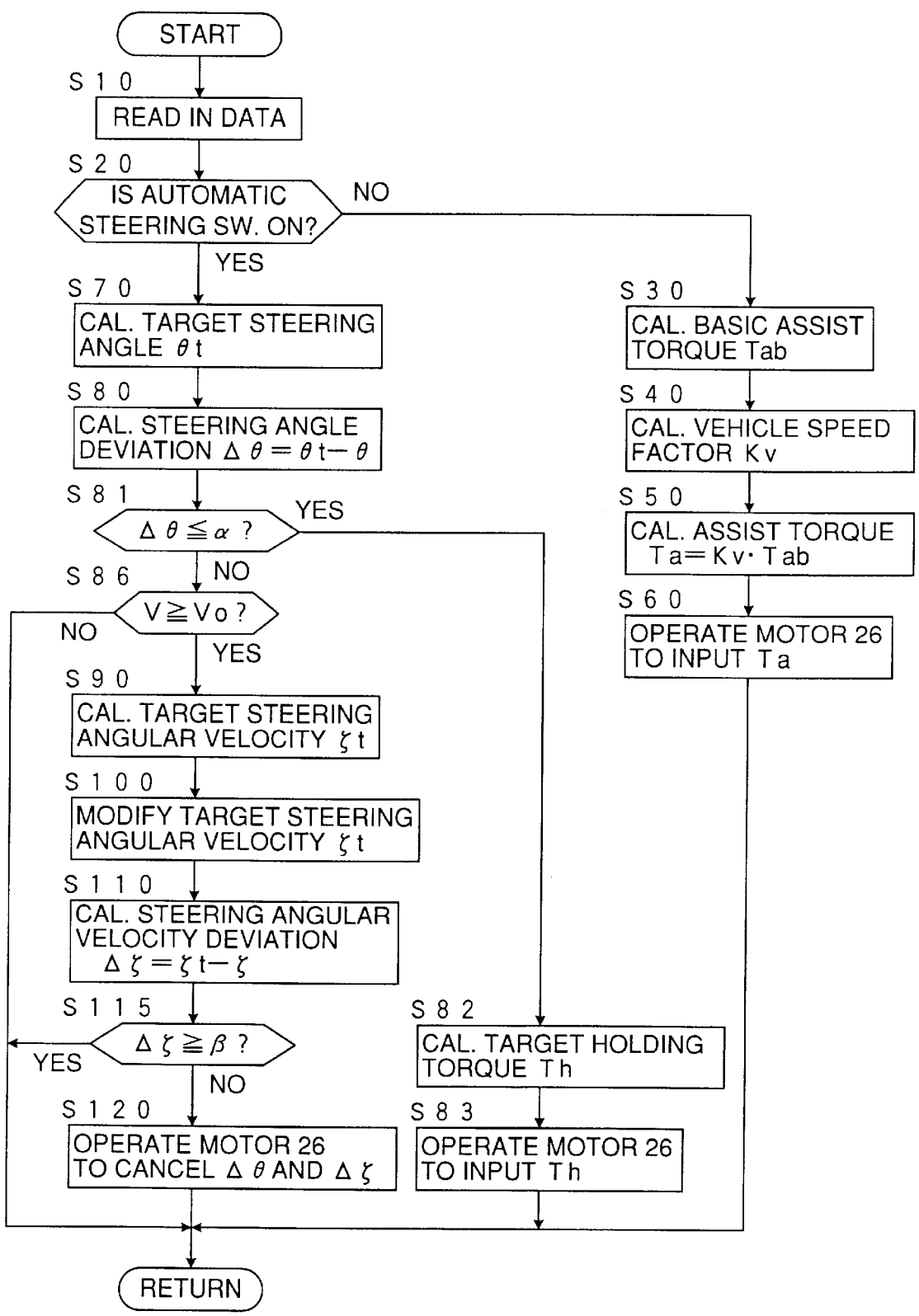
FIG. 10 is a flowchart showing a modified operation of the steering system of the vehicle shown in FIG. 1.

FIG. 10 shows a flowchart similar to that shown in FIG. 2, incorporating some additional steps. In the flowchart of FIG. 10, the steps corresponding to those shown in FIG. 2 are indicated by the corresponding step numbers and operate in the same manner as in the embodiment of FIG. 2.

In the modification of FIG. 10, in step 81, it is judged if the steering angle deviation $\Delta\theta$ is equal to or smaller than a threshold value $\alpha$. The threshold value $\alpha$ is a relatively small value of the steering angle deviation Δθ below which a parking or garaging of a vehicle by this automatic steering device will become unstable by a steering angle deviation Δθ due to an elastic deformation of the tires of the wheels becoming a deviation to be canceled by the automatic steering control. Since such a steering angle deviation produced by an elastic deformation of the wheel tires is flexible in opposite directions, it can happen that the automatic steering control to cancel such a steering angle deviation oscillates forever in opposite directions. Therefore, when the answer is "yes", the control proceeds to step 82, and a target holding torque Th is calculated as appropriately adjusted according to the friction coefficient $\mu$ of a road surface detected by the friction coefficient sensor 40. The target holding torque Th is a torque which will hold the steering vehicle wheels stably against the torque applied thereto by the elastic deformation of the wheel tires. Then in step 83, the motor 26 is operated so as to input a torque to the steering system at a value of Th.

Figure 11:
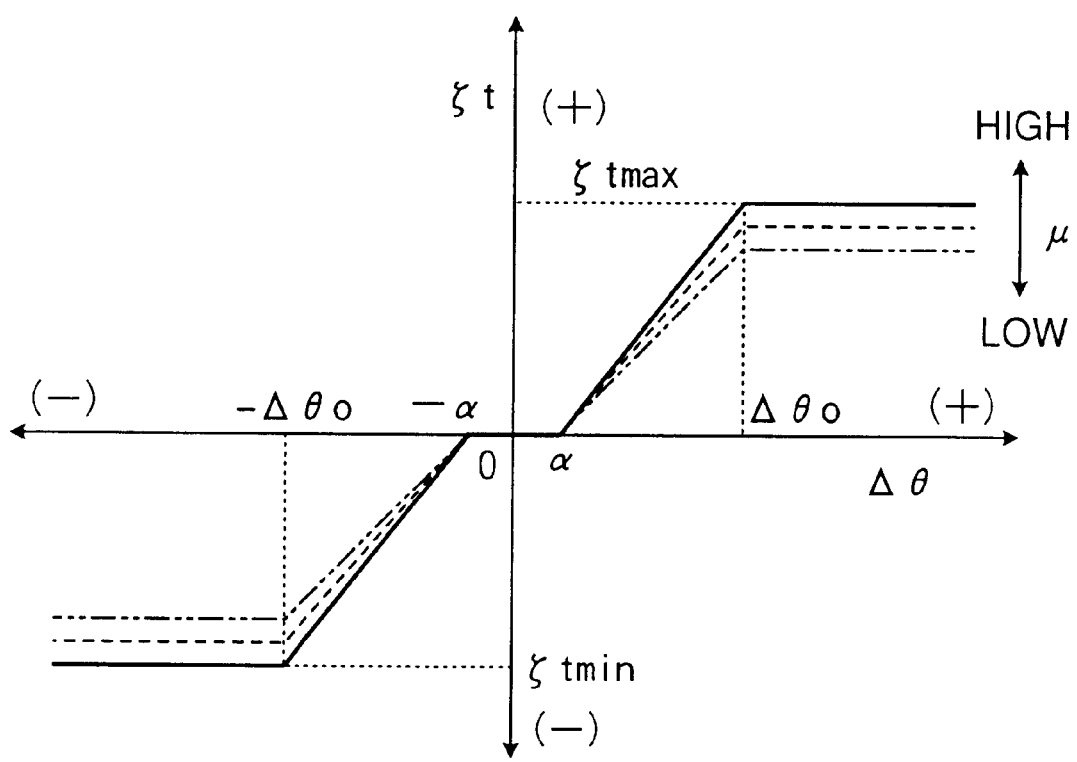
FIG. 11 is a diagram showing a sixth embodiment of calculating the target steering angular velocity against the deviation.

In the modification of FIG. 10, the diagram for calculating the target steering angular velocity ζt against the steering angle deviation Δθ may desirably be modified as shown in FIG. 11.

Further, in the modification of FIG. 10, in step 86 it is judged if the vehicle speed V is equal to or higher than a threshold value Vo. The threshold value Vo is such a low vehicle speed below which the steering torque substantially increases due to a substantially static friction of the tires with the road surface. If the answer is no, the control bypasses steps 90–120. Therefore, in a final stage of an automatic parking or garaging, the motor 26 is deenergized just before the vehicle reaches the final position, so that a relatively high but substantially useless consumption of the electric energy at the final stage of an automatic parking or garaging is avoided.

Further, in the modification of FIG. 10, in step 115, it is judged if the steering angular velocity deviation Δζ is equal to or larger than a threshold value β, and when the answer is "yes", the control bypasses step 120. When the threshold value β is appropriately determined, the answer of step 115 will turn to "yes" only in such an occasion that a steering vehicle wheel was blocked against a steering by a trimming flange or the like on a road or a floor. Therefore, by providing such a step, it can be avoided that an electric energy of a battery or the like is uselessly consumed by pressing a steering wheel against such a trimming flange or the like.

Figure 12:
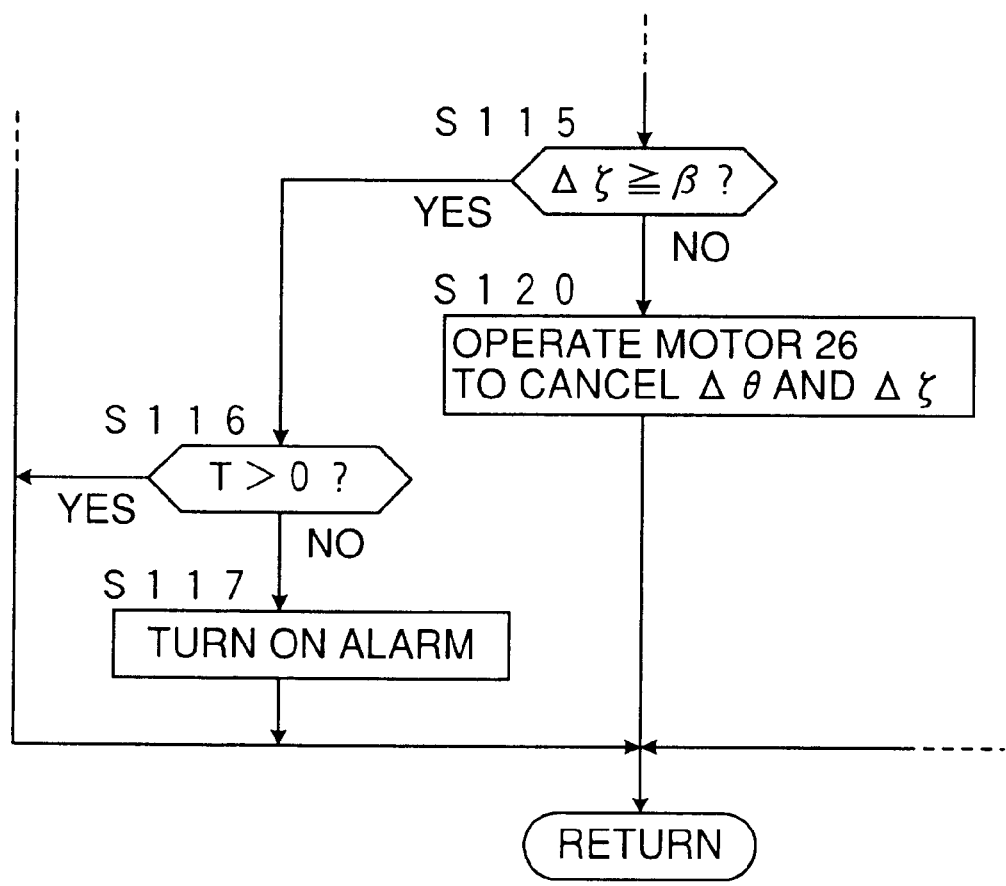
FIG. 12 is a partial flowchart showing a further modification of a part of the flowchart shown in FIG. 10.

The control by step 115 may further be modified as shown in FIG. 12. In this modification, when the answer of step 115 is "yes", it is further judge in step 116 if the driver is turning the steering wheel 16, by judging if the steering torque T detected by the steering torque sensor 36 is not zero. If the answer is "yes", then the control returns, while if the answer is "no", in step 117 an alarm is turned on to draw the driver's attention to a probable obstacle such as a trimming flange or the like.

Although the present invention has been described in detail with respect to some preferred embodiments thereof, it will be apparent for those skilled in the art that various modifications are possible with respect to the shown embodiments within the scope of the present invention.

What is claimed is:

1. An automatic steering device for a vehicle having a pair of steering vehicle wheels, a steering wheel, and a power-assisted steering mechanism for converting a steering movement of the steering wheel to a corresponding steering movement of the steering vehicle wheels, comprising:

a first means for generating a target steering movement of the steering vehicle wheels; and a second means for intervening in the steering mechanism for actuating the steering mechanism so that the steering vehicle wheels are steered to follow the target steering movement in such a feedback manner that a deviation of an actual steering movement from the target steering movement of the steering vehicle wheels is canceled at a speed of cancellation which is increased along with an increase of the deviation at least up to a threshold value determined therefor.

2. An automatic steering device according to claim 1, wherein the second means cancels the deviation by a cyclic repetition of a detection of the deviation and an actuation of the steering mechanism toward the cancellation of the deviation at each speed of cancellation due for each deviation.

3. An automatic steering device according to claim 1, wherein the second means modifies the speed of canceling the deviation according to a friction coefficient of a road surface so as to be relatively higher or lower according to whether the friction coefficient is relatively higher or lower, respectively.

4. An automatic steering device according to claim 1, wherein the second means modifies the speed of canceling the deviation according to a vehicle speed so as to be relatively lower or higher according to whether the vehicle speed is relatively higher or lower, respectively.

5. An automatic steering device according to claim 1, wherein the second means stops canceling the deviation when a vehicle speed has lowered below a threshold value determined therefor.

6. An automatic steering device according to claim 1, wherein the second means stops canceling the deviation when the deviation has lowered below a threshold value determined therefor, while actuating the steering mechanism so that the steering vehicle wheels are held against being moved in a steering direction due to an elastic deformation of tires of the steering vehicle wheels.

7. An automatic steering device according to claim 1, wherein the deviation cancellation speed is so targeted as to increase along with an increase of the difference up to the threshold value determined therefor and to saturate at a final value for a further increase of the deviation.

8. An automatic steering device according to claim 7, wherein the target deviation cancellation speed is so modified according to a friction coefficient of a road surface as to be relatively higher or lower against the deviation according to whether the friction coefficient is relatively higher or lower, respectively.

9. An automatic steering device according to claim 7, wherein the target cancellation speed is so modified according to a vehicle speed as to be relatively lower or higher against the deviation according to whether the vehicle speed is relatively higher or lower, respectively.

10. An automatic steering device according to claim 1, wherein the second means stops canceling the deviation when the target deviation canceling speed is not followed by an actual speed of movement of the steering vehicle wheels beyond a threshold difference determined therefor.

11. An automatic steering device according to claim 10, further comprising a third means for detecting if the steering wheel is turned by a driver, so as to dispatch an alarm to the driver when the deviation canceling speed is not followed beyond the threshold difference determined therefor with no driver's turning of the steering wheel.

* * * * *